US011362731B2

(12) United States Patent
Fanton et al.

(10) Patent No.: US 11,362,731 B2
(45) Date of Patent: Jun. 14, 2022

(54) METHOD FOR TRANSMITTING DATA FROM AN OBJECT ON BOARD AN AIRCRAFT TO A NETWORK OF CONNECTED OBJECTS

(71) Applicant: SAFRAN ELECTRONICS & DEFENSE, Boulogne-Billancourt (FR)

(72) Inventors: Nicolas Fanton, Moissy-Cramayel (FR); Pierre-Jean Tine, Moissy-Cramayel (FR); Emmanuel Couturier, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/289,565

(22) PCT Filed: Oct. 29, 2019

(86) PCT No.: PCT/FR2019/052574
§ 371 (c)(1),
(2) Date: Apr. 28, 2021

(87) PCT Pub. No.: WO2020/089562
PCT Pub. Date: May 7, 2020

(65) Prior Publication Data
US 2022/0014260 A1 Jan. 13, 2022

(30) Foreign Application Priority Data

Oct. 29, 2018 (FR) .......................................1871330

(51) Int. Cl.
*H04B 7/185* (2006.01)
(52) U.S. Cl.
CPC ............................... *H04B 7/18506* (2013.01)

(58) Field of Classification Search
CPC .......................... H04B 7/18506; H04W 80/00
See application file for complete search history.

(56) References Cited

U.S. PATENT DOCUMENTS 6,651,928 B1 * 11/2003 Stuhr ........................ B64C 7/02
244/53 B
10,334,701 B1 * 6/2019 Siminoff .............. H05B 47/105
(Continued)

FOREIGN PATENT DOCUMENTS

EP 2 023 685 A1 2/2009
EP 2 154 865 A1 2/2010
(Continued)

OTHER PUBLICATIONS

French Search Report dated Aug. 23, 2019 in French Application No. 1871330.
(Continued)

*Primary Examiner* — Dinh Nguyen
(74) *Attorney, Agent, or Firm* — Birch, Stewart, Kolasch & Birch, LLP

(57) ABSTRACT

The present invention relates to a method for transmitting data from an object (6) on board an aircraft (1) to a server (3) of a network of connected objects (4), the method comprising: if the aircraft (1) is detected as being in flight, the sending (108) of the data item by the object (6) to an aircraft radio communication device (10) of the aircraft (1) for communication with the ground, and the transmission of the data item by the aircraft communication system (10) to a ground station (2), for subsequent retransmission of the data item by the ground station (2) to the server (3); and, if the aircraft (1) is detected as not being in flight, the sending (116) of the data item by the object (6) to the server (3) without passing through the aircraft radio communication system (10) of the aircraft (1).

17 Claims, 2 Drawing Sheets

(56) References Cited

U.S. PATENT DOCUMENTS

| | | | |
|---|---|---|---|
| 2007/0176793 A1* | 8/2007 | Bruch | B60R 25/1003 340/945 |
| 2007/0265739 A1* | 11/2007 | Griffith | G01C 23/005 701/3 |
| 2010/0042272 A1 | 2/2010 | Gruyer et al. | |
| 2010/0142482 A1 | 6/2010 | Lu et al. | |
| 2016/0001883 A1* | 1/2016 | Sanz | H02J 7/0044 244/17.23 |
| 2017/0039861 A1* | 2/2017 | Ceribelli | G08G 5/0069 |
| 2017/0344000 A1* | 11/2017 | Krishnamoorthy | G08G 5/0013 |
| 2018/0124671 A1* | 5/2018 | Zhang | H04B 7/18506 |
| 2018/0204469 A1* | 7/2018 | Moster | G01C 21/00 |
| 2020/0391864 A1* | 12/2020 | Lee | B64C 39/024 |

FOREIGN PATENT DOCUMENTS

| | | |
|---|---|---|
| FR | 3 087 901 A1 | 5/2020 |
| WO | WO 2013/184894 A1 | 12/2013 |

OTHER PUBLICATIONS

International Search Report issued in International Application No. PCT/FR2019/052574 dated Jul. 1, 2020 with an English Translation.

\* cited by examiner

METHOD FOR TRANSMITTING DATA FROM AN OBJECT ON BOARD AN AIRCRAFT TO A NETWORK OF CONNECTED OBJECTS

FIELD OF THE INVENTION

This invention relates to the field of connected objects.

The invention specifically relates to a method for transmitting data from an object on board an aircraft to a network of connected objects, and a system for implementing such a method.

BACKGROUND

The use of connected objects on board aircraft has become popular.

Some connected objects have the function of acquiring data providing information about the condition of a part of an aircraft. This data is intended to be transmitted to a network of connected objects.

A connected object communicates its data to a network of connected objects by emitting radio signals in a format compatible with the concerned network, i.e. a server belonging to the network can acquire these signals and extract the data therefrom.

Such a transmission to a connected network does not generally pose any problems when the aircraft comprising the connected object is on the ground.

However, when the aircraft is in flight, this transmission can become degraded or even be rendered impossible if the object is out of range of the network of connected objects.

However, it is very important that certain data, for example indicating whether or not the aircraft is in a critical state, be able to be transmitted continuously to the network of connected objects, and particularly when the aircraft is in flight.

SUMMARY OF THE INVENTION

An aim of the invention is to ensure continuity of transmission of data from an object located on board an aircraft to a network of connected objects.

In this aim provision is made, according to a first aspect of the invention, for a method for transmitting a data from an object on board an aircraft to a server of a network of connected objects, the method comprising steps of:
  if the aircraft is detected as being in flight, sending, by the object, of the data to a device for aeronautical radio communication of the aircraft with the ground, and transmission of the data by the aeronautical communication system to a ground station, for the purpose of the subsequent retransmission of the data by the ground station to the server,
  if the aircraft is detected as not being in flight, sending, by the object, of the data to the server without passing through the aeronautical radio communication system of the aircraft.

The method according to the first aspect of the invention may also comprise the following features, taken alone or in combination when this is technically possible.

Preferably, the method comprises the acquisition, by a motion sensor on board the aircraft, of a measurement of motion of the aircraft with respect to the ground, the aircraft being detected as being in flight when the motion measurement crosses a predetermined threshold.

Preferably, the threshold S has a value suitable for being crossed during a taxiing phase of the aircraft.

Preferably, the motion sensor is contained in the object.

Preferably, the motion sensor comprises an accelerometer and/or a gyroscope and/or a linear speed sensor.

Preferably, the object sends the data in a first radio signal to a receiver on board the aircraft when the aircraft is detected as being in flight, and the receiver transmits the data to the aeronautical radio communication device via a local network of the aircraft, for example of wired kind.

Preferably, the data is sent in:
  a first radio signal having a first frequency when the aircraft is detected as being in flight,
  a second radio signal having a second frequency different from the first frequency when the aircraft is detected as not being in flight.

Preferably, when the aircraft is detected as being in flight:
  if the data has a value having crossed a predetermined threshold, the data is sent to the aeronautical radio communication device,
  otherwise, the data is stored by the object in its memory then is sent to the server of the network of connected objects without passing through the aeronautical radio communication system of the aircraft once it is detected that the aircraft is no longer in flight.

Preferably, the data is acquired by a sensor of the connected object, and is:
  a temperature or a pressure in a part of the aircraft, the part being for example a tire of a landing gear, a hold or a nacelle, or
  an item of information indicating if an item of equipment of the aircraft is open or closed, the equipment item being for example a cowling giving access to an engine of the aircraft, or
  a physical measurement making it possible to monitor the use, status or state of wear of an item of equipment, such as: hydraulic pressure, voltage, amperage, position of an element of an item of equipment of the aircraft, orientation of an element of an item of equipment of the aircraft, deflection of a metal element of the aircraft.

Preferably, the network of connected objects is of LPWAN type, for example LoRaWAN or Sigfox.

Provision is also made, according to a second aspect of the invention, for a system for transmitting a data to a server of a network of connected objects, the system being intended to be on board an aircraft, the system comprising an object and an aeronautical radio communication device, wherein
  the object is configured to send a data to the aeronautical radio communication device, if the aircraft is detected as being in flight,
  the aeronautical radio communication device is configured to transmit the data sent by the object to a ground station, for the purpose of the subsequent retransmission of the data by the ground station to the server,
  the object is moreover configured to send the data to the server without passing through the communication system of the aircraft, if the aircraft is detected as not being in flight.

DESCRIPTION OF THE FIGURES

Other features, aims and advantages of the invention will become apparent from the following description, which is purely illustrative and non-limiting, and which must be read with reference to the appended drawings wherein.

In all the figures, similar elements bear identical reference numbers.

DETAILED DESCRIPTION OF THE INVENTION

Figure 1:
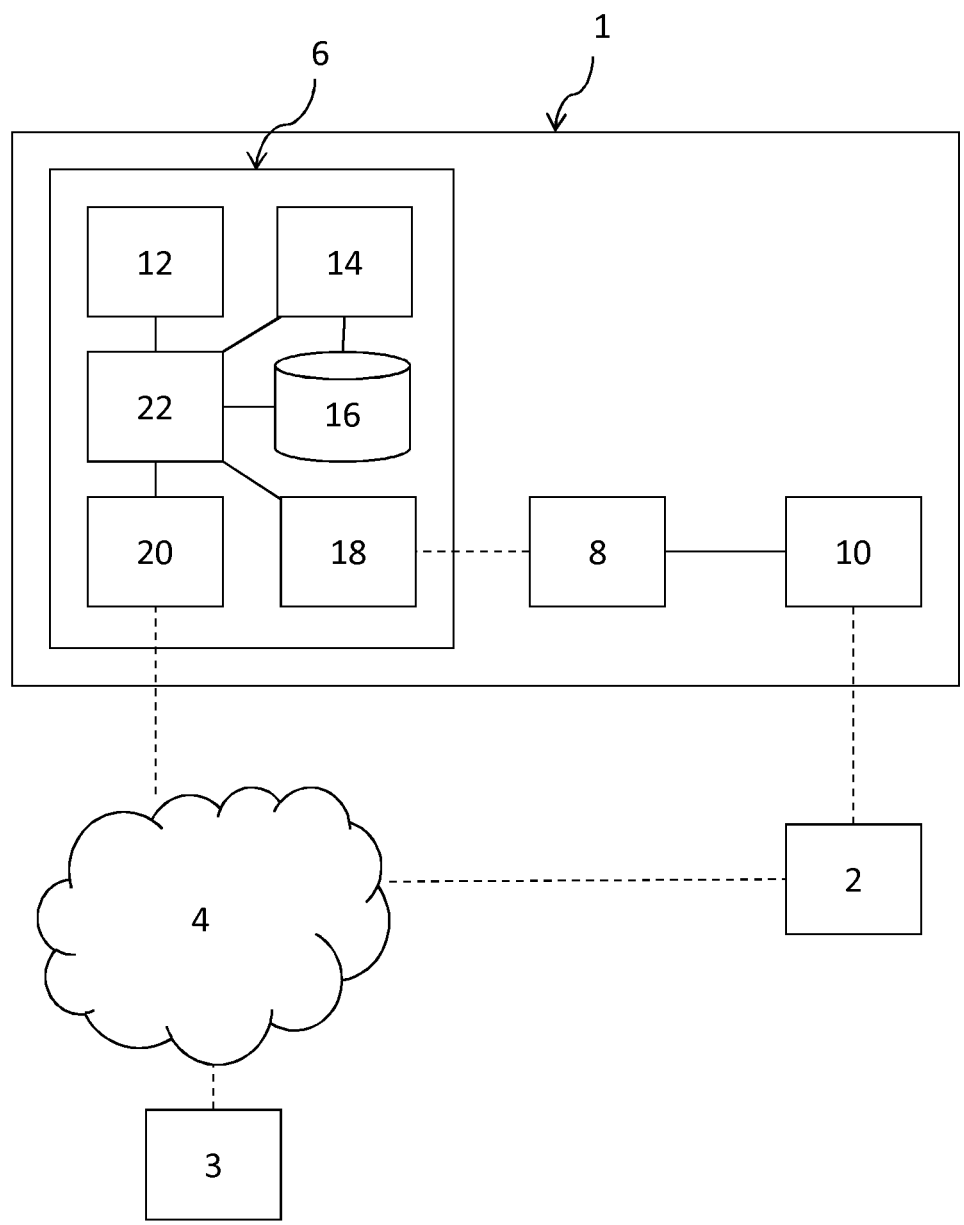
FIG. 1 schematically illustrates an aircraft comprising a transmitting system according to an embodiment of the invention, as well as a ground station and a network of connected objects.

FIG. 1 schematically illustrates an aircraft 1, a ground station 2, a server 3 and a network of connected objects 4.

The aircraft 1 is for example an airplane or a helicopter.

The server 3 is accessible via the network of connected objects 4. It is able to receive data from different connected objects.

The ground station 2 is able to transmit data to the server 3, for example via the network 4 or via a link independent of the network 4 (for example via Internet).

The network of connected objects 4 is of LPWAN type, such as LoRaWAN or Sigfox. Networks of LPWAN type are particularly advantageous as they can be used to emit and receive messages of very small sizes, over very long ranges (for example up to 40 km) in a way that consumes very little power for the emitting object.

The aircraft 1 comprises a system for transmitting data to the network of connected objects 4.

The system for transmitting data comprises an object 6, a radio receiver 8 and an aeronautical radio communication device 10.

The radio receiver 8 is arranged in the aircraft 1 to receive certain radio signals emitted by the object 6. These signals which will be discussed hereinafter.

The aeronautical radio communication device 10 is configured to communicate with a ground station 2 when the aircraft 1 is in flight. It is known per se.

The aeronautical radio communication device 10 is for example configured to communicate with a ground station 2 by way of satellites (for example Satcom, Gatelink).

The aeronautical radio communication device 10 is for example configured to emit radio signals in the Ku frequency band (microwave frequency band from 12 GHz to 18 GHz).

The radio receiver 8 is connected to the aeronautical radio communication device 10 via a local network of the aircraft 1, for example a wired local network, typically of ARINC type.

The object 6 comprises at least one motion sensor 12 adapted to acquire motion measurements with respect to the ground, for example an accelerometer and/or a gyroscope and/or a linear speed sensor.

The subject 6 further comprises at least one second sensor 14 suitable for acquiring data intended to be transmitted to the network of connected objects. The following sensors may be used as the second sensor 14:
- a temperature or atmospheric pressure sensor supplying data about the temperature or pressure in a part of the aircraft 1, for example in a tire of a landing gear, in a hold or even in a container stored in the hold;
- a sensor arranged to supply data indicating whether an item of equipment of the aircraft 1 is open or closed, the item of equipment being for example a cowling giving access to an engine of the aircraft 1;
- a GPS/GNSS receiver supplying data about the position of the object 6 on the basis of navigation signals emitted by satellites, and therefore of necessity data about the position of the aircraft 1 if one assumes that the object 6 is attached to the aircraft 1 or that its motion with respect to the aircraft 1 is negligible.
- A sensor of a physical measurement making it possible to monitor the use, status or state of wear of an item of equipment: hydraulic pressure, voltage, amperage, position of an element of an item of equipment, orientation of an element of an item of equipment, or deflection of a metal element.

The object 6 further comprises a recorder 16 configured to store in a memory thereof data supplied by the or each second sensor 14.

The object 6 further comprises a first communication interface 18 for communicating with the radio receiver 8 also on board the aircraft 1. The first communication interface 18 for example comprises a passive RFID tag. The RFID tag for example allows the parameterization of the object 6.

The first communication interface 18 is configured to emit radio signals having a first frequency F1.

The first frequency is preferably an international frequency. It is for example of 2.4 GHz or contained in the band ranging from 4.2 to 4.4 GHz.

The object 6 further comprises a second communication interface 20 for communicating by radio with the network 4, supposing that this network is within range. The second communication interface 20 comprises a radio antenna and a frequency filter upstream of the antenna for adjusting the frequency of a signal to be emitted via the antenna at a second frequency F2.

The second frequency F2 is different from the first frequency F1.

The second frequency F2 is typically contained in an ISM band. The second frequency F2 is for example contained in the band ranging from 863 MHz to 928 MHz; it is for example equal to 868 MHz.

The second communication interface 20 is configured to emit radio signals compliant with the EUROCAE ED-14E/RTCA DO-160E specification (in any of its versions), Section 21, Category H.

The object 6 moreover comprises a processing unit 22. The processing unit 22 for example comprises at least one processor.

One function of the processing unit 22 is to control the communication interfaces 18 and 20 on the basis of a logic that will be described hereinafter.

The object 6 moreover comprises a battery (not illustrated) for supplying power to the components preceding the object 6. Preferably, the battery is a non-rechargeable lithium battery, in accordance with the ETSO C142a (European Technical Standard Order, Non-rechargeable lithium cells and batteries) specification.

Figure 2:
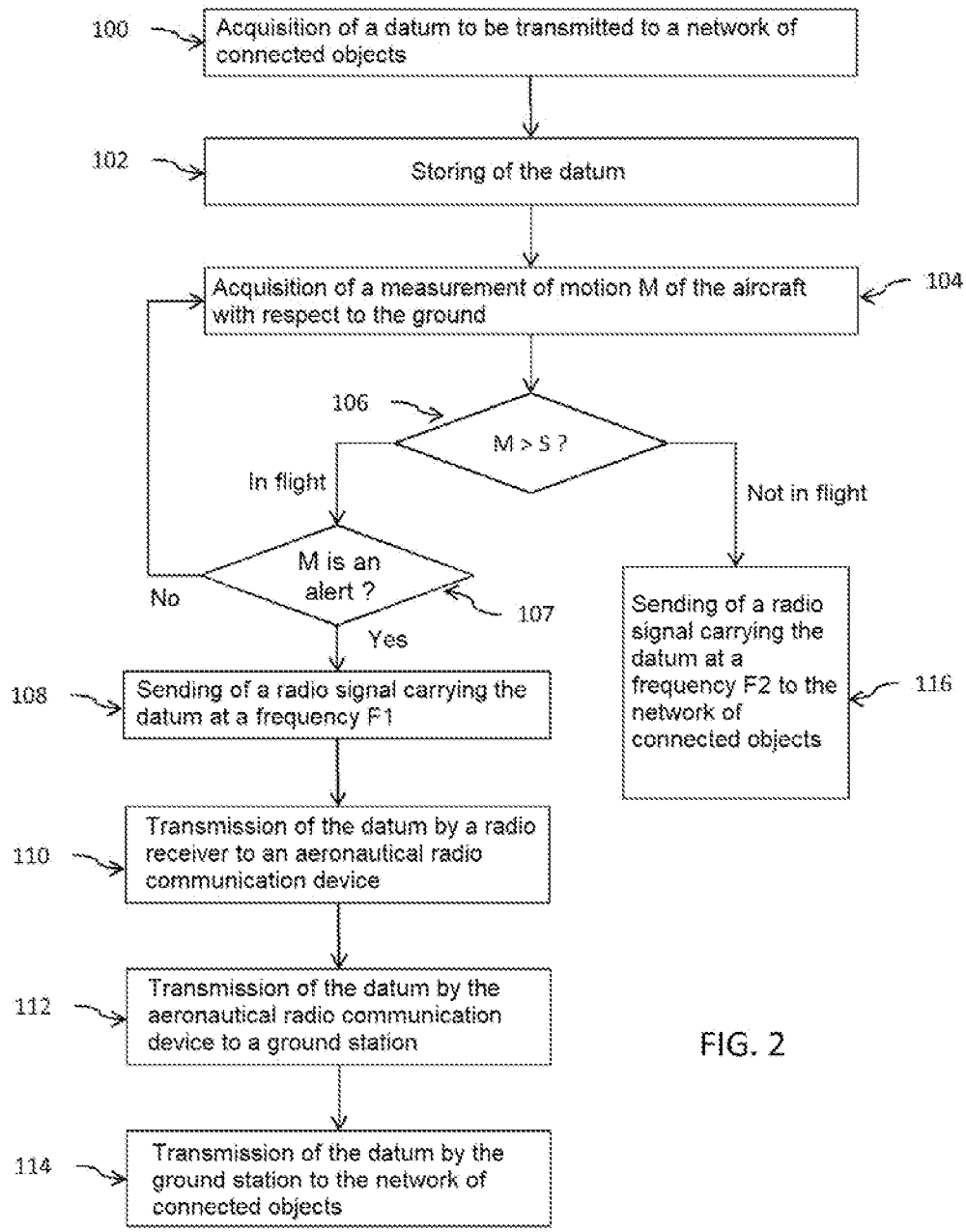
FIG. 2 is a flowchart of steps of a method for transmitting data according to an embodiment of the invention.

With reference to FIG. 2, a method comprises the following steps.

A second sensor 14 of the object 6 acquires data (temperature, pressure etc.), this data being intended to be transmitted to a network of the network of connected objects 4 (step 100).

The acquired data is stored in the memory of the recorder 16 (step 102).

The processing unit 22 implements a test with the aim of determining whether or not the aircraft 1 the transmission system is on board is in flight.

For the implementation of this test, the motion sensor 12 acquires a motion M with respect to the ground (step 104).

The processing unit 22 compares the motion to a predetermined threshold S, for example stored by the recorder 16 in its memory (step 106).

When the motion M is greater than the predetermined threshold S, the processing unit 22 considers that the aircraft 1 is in flight.

When the motion M is not greater than the predetermined threshold S, the processing unit 22 considers that the aircraft 1 is not in flight.

The threshold S associated with a second sensor 14 is chosen greater than the measurement noise of this sensor 14.

When the threshold S is an acceleration, its value is greater than the measurement noise of the sensor in g.

When the threshold S is an angular speed, its value is greater than the measurement noise of the sensor in radians/second.

Moreover, preferably, the threshold S has a suitable value that will not be crossed during a taxiing phase of the aircraft 1. For example a speed value may be chosen for the threshold S between 10 km/h and 50 km/h, or an acceleration value between 0.4 G and 0.7 G.

The implemented test may use several thresholds respectively associated with different sensors 14, in which case the comparing step is implemented for each second sensor 14 involved, the decision as to whether or not the aircraft is in flight being taken according to the respective results of the comparisons made. Using several sensors allows the test to function even when one of the sensors 14 experiences a fault.

It is for example advantageous to use a gyroscope and an accelerometer as sensors 14, to compare the speed acquired by the gyroscope with a speed threshold, compare the acceleration acquired by the accelerometer with an acceleration threshold, and to take a decision as to whether or not the aircraft is in flight according to these two comparisons.

If the aircraft is in level flight, an accelerometer alone will not perceive any motion. It is therefore preferable to also check the absence of rolling motion to avoid the sensor entering GROUND mode in an untimely manner in mid-flight.

If the aircraft 1 is detected as being in flight, the following steps are implemented (on the left-hand part of FIG. 2).

The processing unit 22 commands the object 6 to emit, via the first communication interface 18, a first radio signal carrying the data stored in the memory of the recorder 16, the frequency of the first radio signal being equal to a first frequency F1 as defined previously (step 108).

The first radio signal is acquired by the radio receiver 8 on board the aircraft 1. The radio receiver 8 then transmits the data to the aeronautical radio communication device 10, via the local network of the aircraft 1 (step 110).

The aeronautical radio communication device 10 than transmits the data to the ground station 2, for example via the Satcom, Gatelink or another system (step 112).

It is observed here that, when the aircraft is detected as being in flight, the data transits over the local network of the aircraft. This has the advantage of allowing the flight crew, for example the pilot of the aircraft 1, to be immediately alerted of the value of the data emitted by the object 1. If the flight crew notices that the data has an abnormal value, the flight crew can thus attempt to remedy it. For example, if the data transmitted by the object 1 is a temperature in a hold of the aircraft which turns out to be too high, the pilot can immediately command the lowering of the temperature of the hold in question.

Moreover, when the aircraft 1 is detected as being in flight, the processing unit 22 commands the inhibition of the second communication interface 20, such that it does not emit any radio signal at a frequency F2.

The aim of this inhibition is to avoid violating certain regulations relating to the emissions of signals from an aircraft. For example, whenever the aircraft is in flight, its geographical position is no longer known. For example, the aircraft is no longer allowed to transmit at the 868 MHz frequency for example (ISM Europe frequency), the use of which is prohibited on American territory.

The ground station 2 then transmits the data contained in the signal that the station 2 has received to the server 3. To do so, the ground station 2 for example emits an LPWAN radio signal compatible with the network of connected objects 4, for example a radio signal in the LoRaWAN or Sigfox format (step 114), such that this signal arrives at the server 3 by passing through the network of connected objects 4. In a variant, the station transmits this data to the server 3 via another link, for example of Internet type.

The frequency of this radio signal emitted by the ground station 2 is a second frequency F2 in accordance with the preceding description.

When the device is in flight, the object 6 may be located out of range of the network of connected objects 4. This is why having the data transit via the aeronautical radio communication device 10 of the aircraft 1 when the latter is in flight makes it possible to ensure continuity in the transmission of the data to the network of connected objects 4.

Should the aircraft 1 be detected as not being in flight, the processing unit 22 commands the emission, via the second communication interface 20, of a second radio signal carrying the data stored in the memory of the recorder 16, the frequency of the second radio signal being equal to a second frequency F2 as defined previously (step 116).

The second radio signal is compatible with the network of connected objects 4, in such a way that it can be sensed by an element of this network without the data transiting via the radio communication device of the aircraft 1, and such that its content is transmitted by the server 3.

The preceding steps are repeated for several data to be transmitted to the network of connected objects 4. Preferably, the communication interfaces 18 or 20 continuously emit radio signals carrying data acquired by the object 6 continuously over cycles of a duration not exceeding 3 seconds.

It should be noted that the implementation of steps 108 to 114 may be conditional on the value of the data to be transmitted.

The processing unit 22 can thus proceed to an analysis of the data (step 107) and trigger the step 108 of sending the data in the radio signal at the first frequency F1 on condition that the data has a value having crossed a predetermined threshold.

This condition of sending of the data makes it possible to alert the server 3 to abnormal phenomena occurring inside the aircraft without however consuming a great deal of bandwidth on the link between the aeronautical radio communication device 10 and the ground station 2.

The threshold used as the condition for the sending of the data is typically a bound of an interval of acceptable values for the acquired data.

For example, the range from 5 to 20° C. is a range of acceptable temperatures in certain parts of the aircraft.

If the data has a value contained in an interval of acceptable values (in other words, it has not yet crossed a threshold formed by one of the bounds of this interval), this data is kept in the recorder 16, and its transmission is only made once it is detected that the aircraft is not in flight. Thus, it is via the step 116 that this data is transmitted, and this happens even if this data was acquired by the object 6 during the flight of the aircraft. The sending of the data to the ground station 2 consumes bandwidth at the aeronautical radio communication device, which is of course used to carry other data than those coming from the object 6. Thus, an advantage of setting this condition for triggering step 108 is that it makes it possible to obtain a good trade-off between bandwidth consumption at the aeronautical radio communication device and safety.

The fact that the threshold S used during the preceding method has a value adapted to be crossed during a taxiing phase of the aircraft has several advantages. Primarily, it enables the method to comply with the so-called CTD (Cargo Tracking Device) FAA AC 91.21-1C § 8 regulation.

The invention is not restricted to the embodiments illustrated in the figures and described previously. Specifically, the invention can be the subject of other embodiments.

In the embodiment shown in FIG. 1, two separate communication interfaces are used to respectively emit radio signals at the first frequency (the first communication interface 18), and at the second frequency (the second communication interface 20). In a variant, the subject 6 may comprise only one communication interface for emitting these two types of signal. Such a shared communication interface may comprise an antenna coupled to a frequency modulator configured to adjust the frequency of a radio signal emitted by the antenna at the first frequency or at the second frequency. The model SX1280 marketed by STM is for example usable as a frequency modulator.

Moreover, the radio receiver 8 is optional. The object 6 may be connected to the radio communication device via the wired local network of the aircraft 1, or in other words be part of the local wired network of the aircraft 1. However, this would place heavy manufacturing restrictions on the object 6, since the local networks of the aircraft 1s are strictly regulated. This is why using the radio receiver 8 as a gateway between the object 6 and the communication interface aeronautical radio communication device 10 has the advantage of avoiding such restrictions being a burden on the object 6 itself.

It is not compulsory for the detection of whether or not the aircraft 1 is in flight to be implemented using a motion sensor included in the object.

The motion sensor could be envisioned as being outside the object, but that would complicate the architecture of the transmission system.

Moreover, the detection of whether or not the aircraft is in flight could be implemented using other means than a motion sensor, for example an altimeter. However, the advantage of a motion sensor is that it can function in a pressurized environment (for example a hold of the aircraft 1), which is not the case of an altimeter.

The invention claimed is:

1. A method comprising:
    acquiring, by a motion sensor contained in an object on board an aircraft, a motion measurement of the aircraft with respect to the ground, wherein the aircraft is detected as being in flight when the motion measurement crosses a motion threshold;
    when the aircraft is detected as being in flight, sending data from the object to an aeronautical radio communication device on board the aircraft, and transmitting the data from the aeronautical radio communication device to a ground station, wherein the ground station is configured to retransmit the data to a server;
    when the aircraft is detected as not being in flight, sending data from the object to the server without passing through the aeronautical radio communication device.

2. The method of claim 1, wherein the motion threshold has a value suitable for being crossed during a taxiing phase of the aircraft.

3. The method of claim 1, wherein the motion sensor comprises at least one of an accelerometer, a gyroscope and a linear speed sensor.

4. The method of claim 1, wherein the object sends the data in a first radio signal to a receiver on board the aircraft when the aircraft is detected as being in flight, and the receiver transmits the data to the aeronautical radio communication device via a local network of the aircraft.

5. The method of claim 4, wherein the local network is a wired network.

6. The method of claim 1, wherein the data is sent in a first radio signal having a first frequency when the aircraft is detected as being in flight, and in a second radio signal having a second frequency different from the first frequency when the aircraft is detected as not being in flight.

7. The method of claim 1, wherein, ben the aircraft is detected as being in flight:
    when the data has a value having crossed a second threshold, the data is sent to the aeronautical radio communication device,
    otherwise, the data is stored by the object in its memory then is sent to the server of the network of connected objects without passing through the aeronautical radio communication system of the aircraft once it is detected that the aircraft is no longer in flight.

8. The method of claim 1, wherein the data is a temperature or a pressure in a part of the aircraft.

9. The method of claim 8, wherein the part of the aircraft is a tire of a landing gear, a hold or a nacelle.

10. The method of claim 1, wherein the data indicates whether an equipment of the aircraft is open or closed.

11. The method of claim 10, wherein the equipment is a cowling giving access to an engine of the aircraft.

12. The method of claim 1, wherein the data is a physical measurement making it possible to monitor the use, status or state of wear of an equipment.

13. The method of claim 12, wherein the physical measurement is a hydraulic pressure, a voltage, an amperage; a position of an equipment of the aircraft, an orientation of an equipment of the aircraft, or a deflection of a metallic element of the aircraft.

14. The method of claim 1, wherein the network of connected objects is of LPWAN type.

15. The method of claim 1, wherein the network of connected objects is LoRaWAN.

16. The method of claim 1, wherein the network of connected objects is Sigfox.

17. A system comprising:
    an object comprising a motion sensor configured to acquire a measurement of motion of an aircraft with respect to the ground when the system is on board the aircraft, the aircraft being detected as being in flight when the motion measurement crosses a motion threshold;
    an aeronautical radio communication device on board the aircraft;
    wherein the object is configured to send data to the aeronautical radio communication device when the aircraft is detected as being in flight;
    wherein the aeronautical radio communication device is configured to transmit the data sent by the object from the aircraft to a ground station, wherein the ground station is configured to retransmit of the data to a server; and wherein the object is further configured to send the data to the server without passing through the aeronautical radio communication device of the aircraft when the aircraft is detected as not being in flight.

\* \* \* \* \*